No. 836,075. PATENTED NOV. 13, 1906.
L. S. LOUDON.
COMBINATION TOOL.
APPLICATION FILED SEPT. 16, 1905.
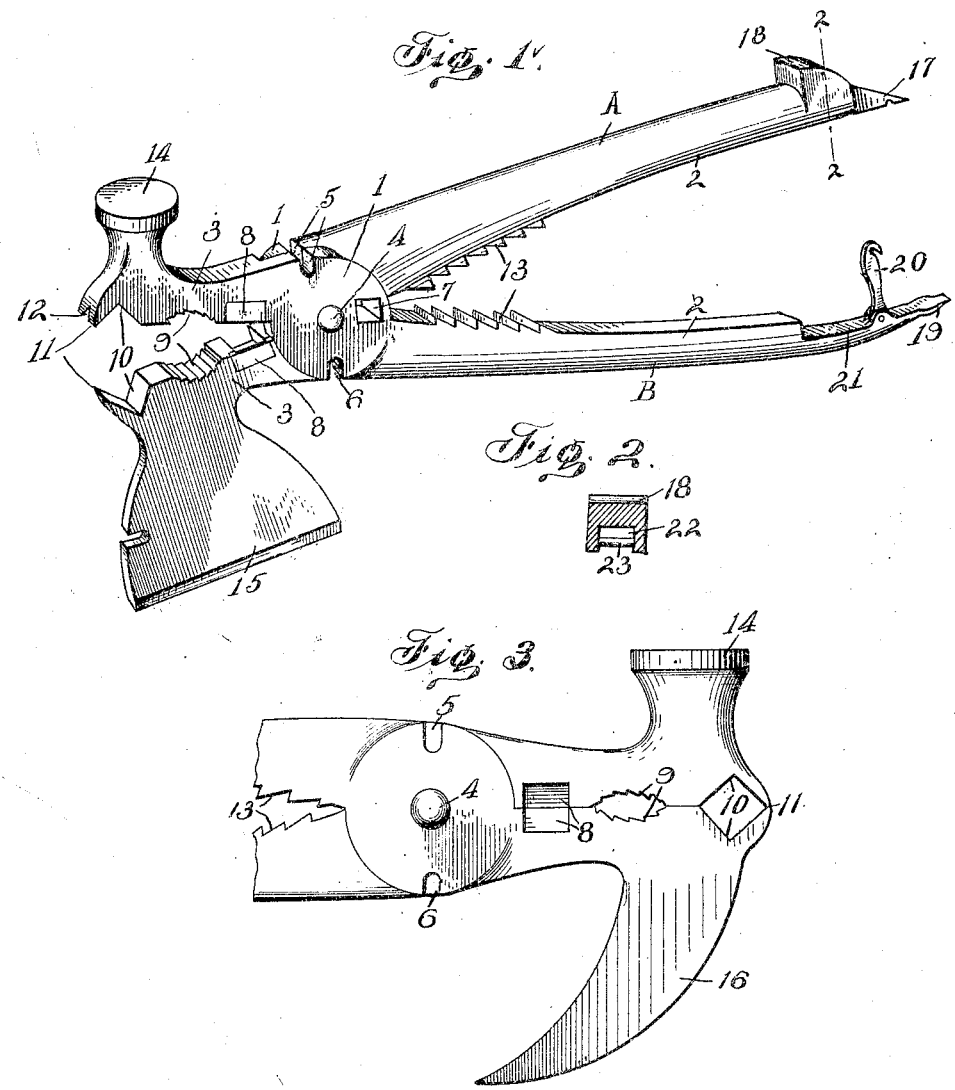
Witnesses
H. A. Robinette
F. B. Rosenthal
Inventor
Lewis S. Loudon
By G. Ayres
Attorney

UNITED STATES PATENT OFFICE.

LEWIS SHANKS LOUDON, OF KANSAS CITY, MISSOURI.

COMBINATION-TOOL.

No. 836,075.

Specification of Letters Patent.

Patented Nov. 13, 1906.

Application filed September 16, 1905. Serial No. 278,726.

*To all whom it may concern:*

Be it known that I, LEWIS SHANKS LOUDON, a citizen of the United States, residing at Kansas City, in the county of Jackson and State of Missouri, have invented certain new and useful Improvements in Combination-Tools, of which the following is a specification.

This invention relates to combination-tools; and it has for its object to provide a tool of this character that will have its components arranged in such a manner that although a maximum number of instruments is provided a compact tool is produced.

Other and further objects will appear in the following description and will be more particularly pointed out in the appended claim.

In the drawings, Figure 1 is a perspective view of one embodiment of my invention. Fig. 2 is a section on the line 2 2, Fig. 1; and Fig. 3 is a detail side elevation of another embodiment of my invention.

Referring more particularly to the drawings, A and B indicate a pair of levers each having a disk-shaped hub 1, a long bowed arm 2 on one side of the hub, and a short arm 3 on the opposite side of the hub, the levers being pivoted together by a pivot-pin 4, which passes centrally through the disk-shaped hubs. Each hub is provided on opposite points of its periphery with wire-receiving notches 5 and 6, the adjacent notches on the two hubs registering when the levers are in a slightly-open position, as shown in Fig. 1. After a wire is inserted in the registering notches and the levers are closed a severance of the wire takes place, due to the sharp corners of the notches. One of the disks is provided with an eccentrically-positioned tapered polygonal bit-opening 7, which is located nearer the longer arm, so that the ends of the short arms will be a greater distance therefrom than if it were centrally positioned, and serve as handles when a bit is inserted in the opening.

The opposed faces of the short arms of the levers are provided with four instruments; first, a pair of cutter-blades 8, which are positioned nearest the pivots so that they will have greater power; second, a pipe-wrench composed of curved and oppositely-notched walls 9; third, a nut-wrench formed by V-shaped notches 10 near the ends of the short arms, being located away from the pivot to permit the engagement of nuts of various sizes, and, fourth, nippers 11 at the extreme ends of the short arms, the outer walls of the nut-wrench merging into the nippers and the nippers being notched at 12 to engage the head of tacks, staples, and the like. On its outer face one of the short arms is provided with a hammer-face 14, while the outer face of the other short arm may be provided with a hatchet 15, as shown in Fig. 1, or a claw 16, as shown in Fig. 3.

The opposed faces of the longer bowed arms are provided near their inner ends with teeth 13, the teeth on one face being disposed in a direction opposite to the teeth on the other face, forming an alligator-wrench. By positioning these teeth near the inner ends of a pair of bowed arms I secure a great leverage and am enabled to grip objects of various sizes, owing to the jaws gradually increasing in width. The outer ends of the long arms are spaced from one another when in a closed position, so as to permit the use of the staple-puller 17, formed on the end of one of the long arms. A short distance from the end of the arm carrying the staple-puller is a projection 18, which acts as a fulcrum for the said puller. The outer end of the other long arm is flattened into a screw-driver 19, which projects beyond the staple-puller. Thus it will be seen that both the staple-puller and the screw-driver may be employed while the levers are in their closed positions.

To hold the levers closed, one of the long arms carries near its end a pivoted latch 20 and is recessed at 21 to provide a pocket for the latch, so that it will not be in the way when the tool is opened. The fulcrum or projection 18 is hollowed, as at 22, and contains a latch-bar 23, with which the latch 20 engages.

It will be seen that the latch is positioned away from the ends of the long arms 2 and between the opposed faces, thereby preventing its interfering with the use of any of the instruments in either the open or closed position of the tool.

Having thus described my invention, what I claim as new therein, and desire to secure by Letters Patent, is—

A combination-tool comprising a pair of pivoted arms constructed to diverge at one side of their pivot, coöperating sets of teeth on such divergent portions of said arms, means for detachably locking said arms against rotation about their pivot, whereby said coöperating sets of teeth are rigidly locked in at an unvarying angle to constitute an alligator-wrench, and wrench-surfaces on said arms at the side of their pivot opposite said alligator-wrench and coöperating to constitute a wrench when said detachable locking means is released, substantially as described.

In testimony whereof I affix my signature in presence of two witnesses.

LEWIS SHANKS LOUDON.

Witnesses:
H. LOUDON,
MARY C. FLOWERS.